April 13, 1965  C. O. LEWIS  3,177,999
ACTUATING MECHANISM FOR CLUTCH ASSEMBLY
Filed Sept. 30, 1960  3 Sheets-Sheet 1

INVENTOR.
*Carl O. Lewis*
BY
ATTORNEY

April 13, 1965  C. O. LEWIS  3,177,999
ACTUATING MECHANISM FOR CLUTCH ASSEMBLY
Filed Sept. 30, 1960  3 Sheets-Sheet 2
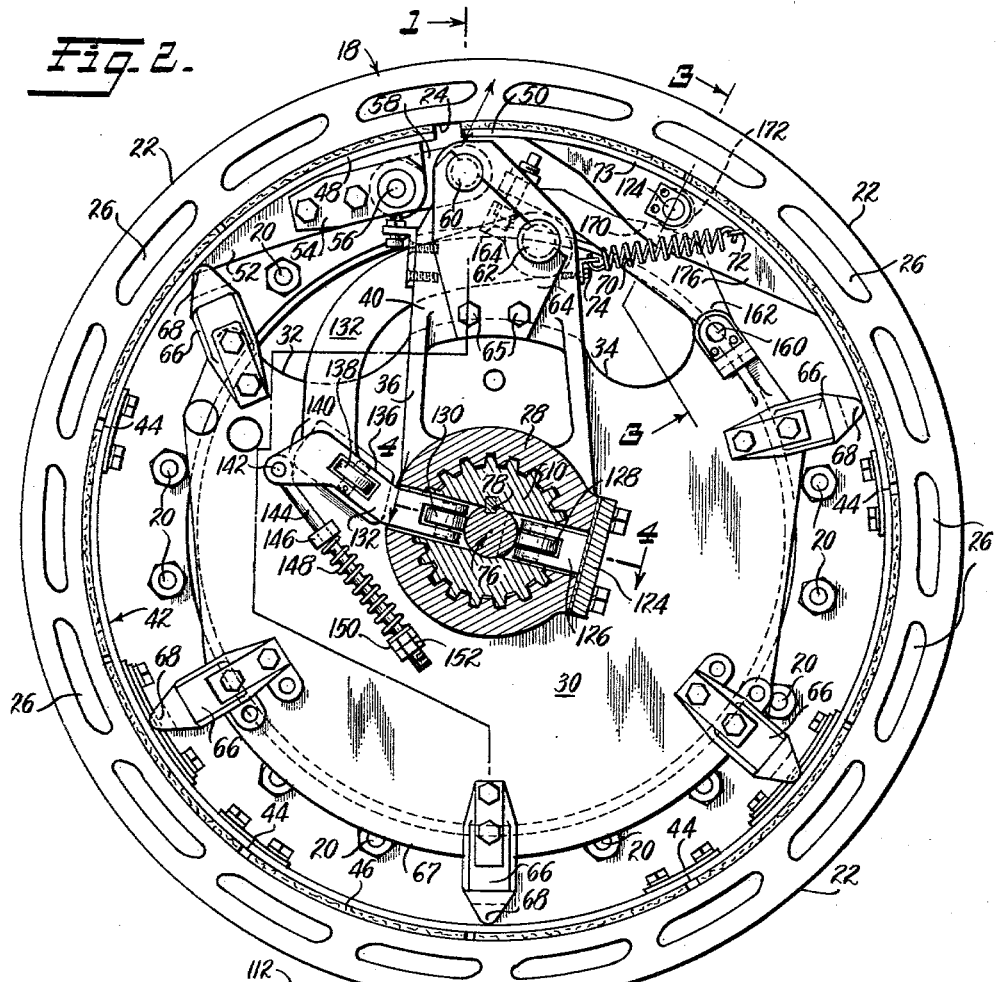
Fig. 2.
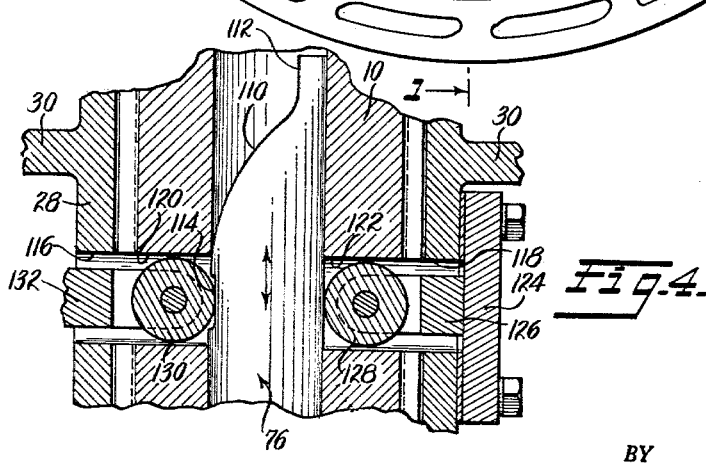
Fig. 4.
INVENTOR.
Carl O. Lewis
BY
ATTORNEY

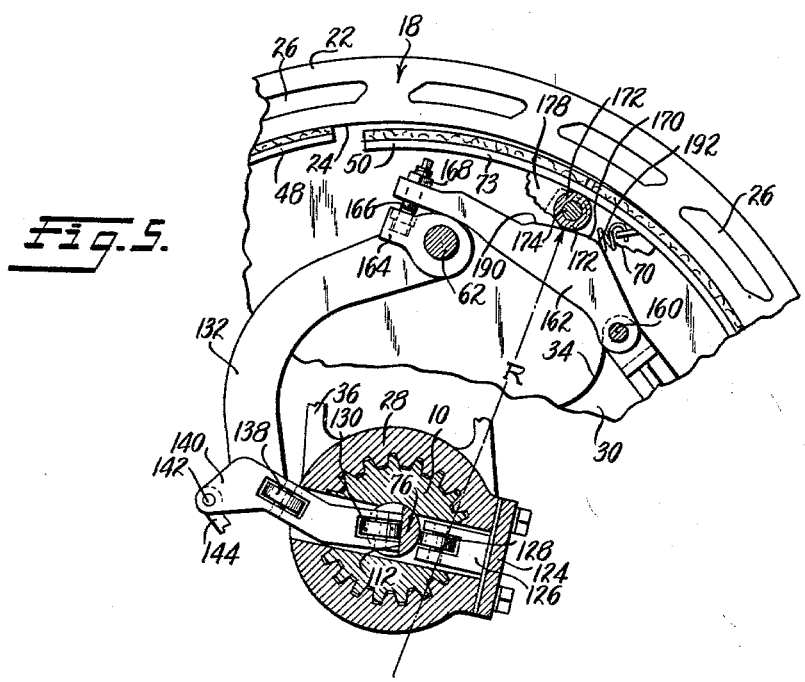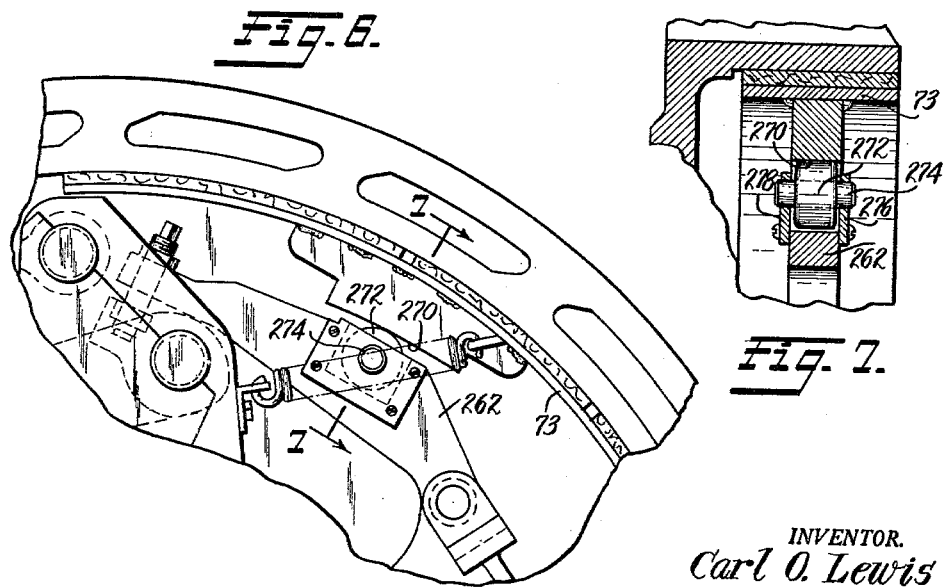

United States Patent Office 3,177,999
Patented Apr. 13, 1965

3,177,999
ACTUATING MECHANISM FOR CLUTCH
ASSEMBLY
Carl O. Lewis, Manitowoc, Wis., assignor to Manitowoc
Engineering Corporation, Manitowoc, Wis., a corporation of Wisconsin
Filed Sept. 30, 1960, Ser. No. 59,690
16 Claims. (Cl. 192—99)

This invention relates to clutch assemblies for rotatably mounted drums and more particularly pertains to control or actuating mechanisms therefor wherein heat expansion of the rotatable drums may be automatically compensated for to enable the clutch assemblies to be fully effective and operative even under extreme conditions of operation.

In heavy duty equipment, such as power cranes, shovels and equipment of the type designed for high capacity loads, the clutch assembly employed therein for the purpose of winding and unwinding the operating cable or cables thereof is subjected to extreme operating conditions. This may occur naturally due to the heavy loads handled by the equipment or the conditions may be aggravated by virtue of the fact that many operators consistently employ the clutch assembly as a brake slipping the clutch assembly under power to controllably lower or raise the load. When the clutch assembly comes under such heavy duty cycles, the drum upon which the clutch assembly operates becomes heated to as much as approximately 400° F. Such heat build up is further enhanced owing to the fact that, for compactness, most designs employ a brake mechanism acting upon a portion of the drum common with the clutch assembly and normal brake application will also cause rapid heating of the common drum.

The above mentioned condition of drum heating gives rise to certain problems in the clutch control or actuating mechanism for the clutch assembly. The main problem being the danger that the actuating mechanism which actually moves the clutch into engagement with the drum may be exceeded in its capacity to operate, that is to say, since the clutch normally engages a portion of the drum internally, the drum may expand, due to heat build up, to such an extent that the control or actuating mechanism may not have sufficient mechanical throw or movement to positively engage the clutch assembly with the drum under extreme conditions.

It is, therefore, of primary concern in connection with the present invention, to provide control or actuating mechanism for an internally acting clutch assembly of the type described in which a device is provided for automatically compensating for clutch drum expansion so that the clutch assembly may operate efficiently even under extreme conditions of heat.

It is also an object of this invention to provide clutch control or actuating mechanism of the character described which includes a direct mechanical linkage device to a clutch band of a clutch assembly so that an operator may at all times have a natural "feel" of the clutch operation, in contradistinction to the lack of "feel" inherent in other types of mechanism for operating clutch assemblies.

More specifically, the present invention envisages control or actuating mechanism including a cam device for a clutch assembly of heavy duty equipment, such as cranes or the like, in which a rotatable drum is employed with the cam device automatically compensating for heat expansion of the rotatable drum.

An additional object of this invention is to provide clutch control or operating mechanism of the type described which includes a device for compensating for wear of a clutch band of the clutch assembly resulting from the operation thereof.

A further object of this invention is to provide an improved clutch control or actuating mechanism which may be employed in heavy duty equipment having a rotatable drum wherein there is employed a clutch band which engages the rotatable drum and the control or actuating mechanism includes a device which may compensate for the wear occasioned by the engagement and disengagement of the clutch band with the rotatable drum.

In order to overcome the difficulties and to accomplish the objects as stated above, this invention provides improved clutch control or actuating mechanism for effectively urging a clutch band of a clutch assembly into engagement with the inner surface of a flange of a rotatably mounted drum to enable the drum to rotate with a rotating power shaft. The clutch control or actuating mechanism includes a cam device for automatically compensating for expansion of the flange of the drum due to heating thereof and a device for compensating for wear of the clutch band due to the operation of the clutch assembly. The cam device includes a plunger having a cam surface thereon which projects into a hollow end portion of the shaft, a rod for moving the plunger axially relative to the shaft, a first lever having one end portion pivotally mounted to the clutch assembly and a first cam follower carried by the other end portion thereof in engagement with the cam surface on the plunger, a second lever having one end portion pivotally secured to the clutch assembly and adjustably connected adjacent the other end portion thereof to an intermediate portion of the first lever, and a second cam surface and a second cam follower in engagement with the second cam surface disposed between the intermediate portion of the second lever and the clutch band of the clutch assembly. The device for compensating for wear of the clutch band comprises an adjustable connection between the other end portion of the second lever and the intermediate portion of the first lever.

Other objects, advantages and important features of the invention will be apparent from a study of the specification following taken with the drawing which together describe, disclose and illustrate certain preferred embodiments or modifications of the invention and what is now considered and believed to be the best mode of practicing the principles thereof. Other embodiments or modifications may be suggested to those having the benefit of the teachings herein, and such other embodiments or modifications are intended to be reserved especially as they fall within the scope and breadth of the subjoined claims.

In the drawing:

FIGURE 1 is a fragmental side elevational view, partially in section, as taken along the line 1—1 in FIG. 2 and looking in the direction of the arrows, of a drum having a flange portion, a clutch assembly for engaging the flange portion of the drum and a control or actuating mechanism including a device for urging the cluch assembly into and out of engagement with the flange portion of the drum with the clutch assembly being illustrated in engagement with the flange portion of the drum;

FIGURE 2 is an end elevational view, partially in section, taken along the line 2—2 of FIG. 1, looking in the direction of the arrows;

FIGURE 3 is a partial sectional view taken along the line 3—3 of FIG. 2 looking in the direction of the arrows and more clearly illustrating certain linkage and cam devices of the actuating mechanism;

FIGURE 4 is an enlarged partial sectional view taken along the line 4—4 of FIG. 2 looking in the direction of the arrows and more clearly illustrating other certain linkage and cam devices of the actuating mechanism;

FIGURE 5 is a partial view of FIG. 2 and simplified by omitting certain portions thereof and illustrating the linkage and cam devices of the clutch actuating mechanism being positioned so that the clutch assembly is disengaged from the flange portion of the drum;

FIGURE 6 is an enlarged partial view similar to FIG. 5 and illustrating a modification of certain linkage and cam devices of the clutch actuating mechanism, and FIGURE 7 is a sectional view taken along the line 7—7 of FIG. 6 looking in the direction of the arrows and further illustrating the details of the modification of the invention as shown therein.

Figure 1:
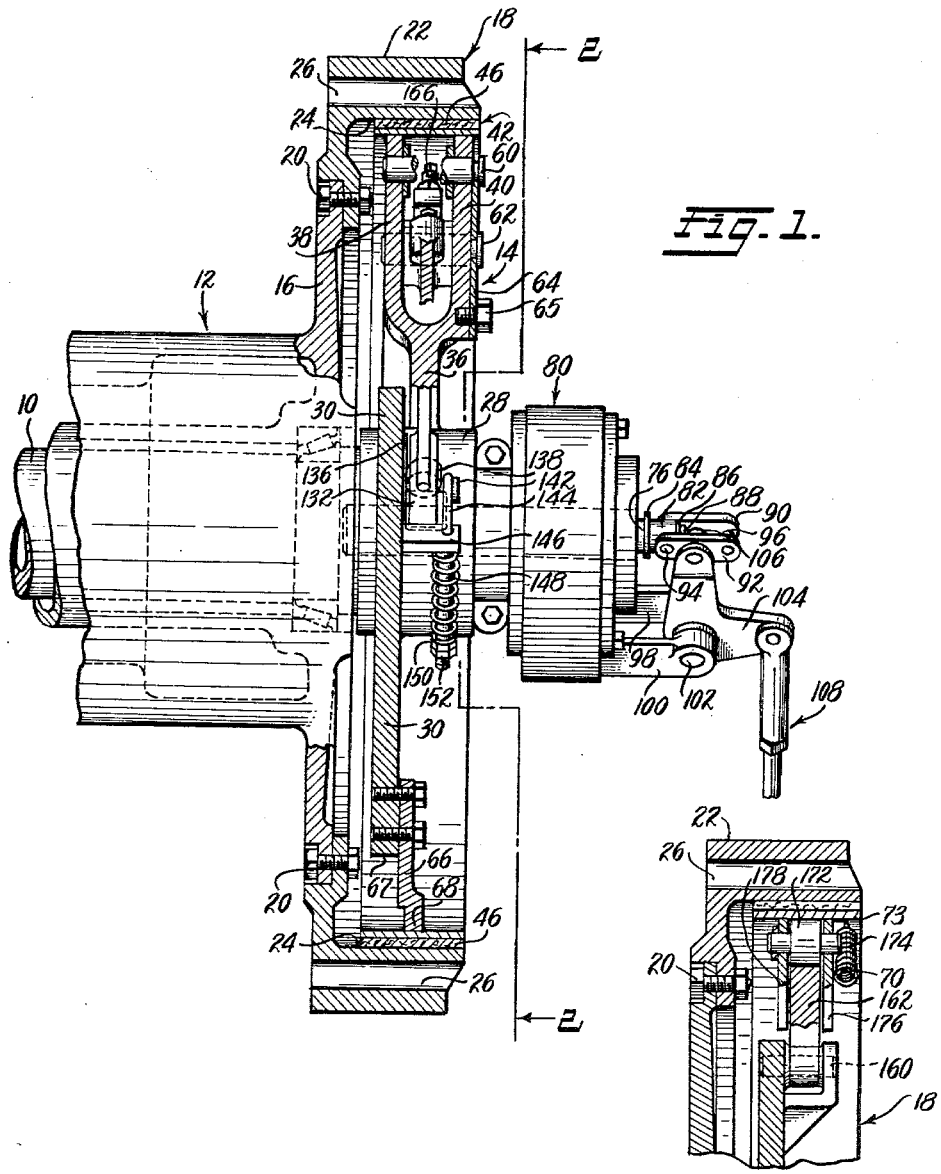

Attention is now directed to FIGS. 1 and 2 of the drawing wherein there is illustrated a portion of a hoisting structure for heavy duty type equipment which may include a main power shaft 10 normally rotated by a suitable power plant, not illustrated, having rotatably mounted thereon a drum 12 about which an operating cable, not shown, may be wound. Normally, the drum 12 is free of the shaft 10 and is coupled thereto only when a clutch assembly 14, to be described and disclosed in more detail hereinafter, is actuated into engagement therewith. The drum 12 includes a generally radially extending end portion 16 to which a combined clutch and brake drum flange 18 is attached, this being effected by integral construction or by suitable fasteners 20 as shown.

The clutch and brake drum flange 18 defines generally axially and circumferentially continuously extending radially aligned and concentrically disposed annular outer 22 and inner 24 surfaces with the outer surface 22 defining an area which may be engaged by a brake mechanism, not illustrated, and the inner surface 24 defining an area which may be engaged by a clutch band of the clutch assembly 14. This is standard practice and is done primarily in the interest of compactness. As is also conventional, the flange 18 may be provided with perforations 26 to effect maximum heat dissipation.

The clutch assembly 14 includes a spider structure having a hub portion 28 splined to the main power shaft 10, note FIG. 2, and a generally part-circular plate portion 30 having certain segments 32 and 34 thereof cut away for clearance purposes as will presently appear.

Additionally, the spider structure includes a yoke 36 extending generally radially from the hub portion 28 and the yoke 36 is provided with a bifurcated extremity which defines spaced apart leg portions 38 and 40. It will be appreciated that the entire spider structure rotates in unison with the main power shaft 10 and carries therewith a clutch band 42 which may take any conventional general form. The form of the clutch band 42, as illustrated, is of the segmental shoe type wherein adjacent shoes are joined by links 44, each such shoe having bonded or riveted thereto a clutch lining piece 46.

One end portion 48 of the clutch band 42 is dead and is connected to the spider structure whereas the other end portion 50 thereof is free. To effect the dead connection, the end portion 48 of the clutch band 42 may be provided with a pair of webs 52 integral or rigid with the adjacent corresponding clutch shoe. The webs 52 carry a plate 54 which holds a pin 56 captive therebetween, such pin forming a connection for one end of a link 58 which extends therefrom to a connection at a pin 60 carried between the leg portions 38 and 40 of the yoke 36. For the purpose of holding the pin 60 and a pivot pin 62 in place against axial displacement and disengagement from the leg portions 38 and 40, a locking plate 64 is secured to the leg portion 40 by fasteners 65 and as shown in FIGS. 1 and 2, the locking plate 64 is provided with semicircular notches fitting into circumferential grooves in the pins 60 and 62.

As illustrated in FIG. 2, the plate 30 is provided with a peripheral edge 67 which is spaced inwardly from the clutch shoes and carried by the plate 30 in circumferentially spaced relationship thereon are a plurality of guide fingers 66, each having a nose portion 68 engaging the radially adjacent clutch shoe so as to normally maintain the clutch band 42 in close proximity to but slightly radially inwardly spaced from the inner surface 24 of the drum flange 18. The clutch band 42 is normally maintained out of engagement with the inner surface 24 by a bias 70, such as a return spring, anchored adjacent one end portion to an apertured ear 72 carried by an end clutch shoe 73 which is adjacent to the free end portion 50 of the clutch band 42 with the opposite end portion of the spring 70 being connected to an apertured bracket 74 fixed to the yoke leg portion 40.

A control or actuating mechanism is provided for urging the free end portion 50 of the clutch band 42 into and out of engagement with the inner surface 24 of the drum flange 18 in a direction indicated generally by the double headed arrow in FIG. 2. The control or actuating mechanism comprises a cam-linkage-cam arrangement which includes a first linkage actuating cam device having an axially movable plunger cam 76 secured by a key 78 within a hollow end portion of the main power shaft 10 so as to turn therewith. The plunger cam 76 has an outer extremity projecting from the end of the main power shaft 10, beyond a bearing support 80 therefor, and the outer extremity is provided thereat with a portion of reduced diameter upon which a sleeve 82 is rotatably fitted between washers 84 and 86 in a manner to permit slight axial movement thereof upon the reduced portion of the plunger cam 76 or, in other words, in such manner as to assure free turning of the sleeve 82 relative to the plunger cam 76. The washer 86 is held engaged against the free end of the plunger cam 76 by a suitable fastener 88, such as a machine bolt or the like.

The sleeve 82 carries a pair of short pins 94 which project respectfully into a circular recess in one end of each link 90 and 92 and the opposite ends of the links 90 and 92 are maintained in parallelism by a spacer 96. A pair of stands 98 and 100 carry a pivot pin 102 which enables oscillation of a bell crank 104, the latter having a bifurcated end straddling the links 90 and 92 and carrying a connecting pin 106 which pivotally connects the bell crank 104 thereto. The opposite end of the bell crank 104 is connected to a manually actuated elongated rod 108 under the control of an operator. In this manner, the plunger cam 76 may be moved axially relative to and within the main power shaft 10.

Referring now to FIG. 4 of the drawing, it will be noted that the other end or inner portion of the plunger cam 76 is provided with a first or sloping cam surface 110 leading from an inner laterally or transversely reduced portion which defines a surface 112 to an outwardly laterally or transversely extended portion having an engaging recess 114 formed therein. The hub portion 28 of the spider structure is provided with diametrically opposed openings 116 and 118 aligned with transverse openings 120 and 122 in the hollow plunger cam receiving end portion of the main power shaft 10. A backing plate 124 is fastened to one side of the hub portion 28 and carries a stand 126 for mounting a roller 128 which engages the plunger cam 76 in a manner which is opposed to a cam follower 130, such as a roller, which is rotatably carried by a cam follower support 132 in the form of a lever which is a part of a first linkage device to be described and disclosed in more detail hereinafter. The cam follower supporting lever 132 extends from adjacent the surfaces 110 or 112 or the recess 114, depending on the axial relative position of the plunger cam 76, in curvilinear fashion, as illustrated in FIGS. 2 and 5, to a location between the leg portions 38 and 40 of the yoke 36 whereat the remote end portion thereof is pivotally mounted and secured to the pivot pin 62.

The spider structure is further provided with a raised reaction surface 136 along which a guide roller 138, journalled on the cam follower supporting lever 132, acts to restrain and prevent movement of the cam follower supporting lever 132 with the plunger cam 76 generally axially relative to the main power shaft 10 when the plunger cam 76 is moved in a manner as described above. The cam follower supporting lever 132 is also provided with an ear 140 and a pivot 142 pivotally connected to a rod 144 which passes through a guide 146 fixed to the spider plate 30 to define a seat for one end portion of a bias 148, such as a compression spring, disposed in a manner to surround the rod 144 and extend generally longitudinally therealong with the opposite end portion thereof engaging an adjustable seat 150 carried by the rod 144. The free end of the rod 144 is threaded to receive a lock nut 152 for the adjustable seat 150 so that the compression spring 148 may push against the seat 150, pulling the rod 144, which in turn pulls the cam follower supporting lever 132 in a direction to maintain the cam follower 130 in engagement with the plunger cam 76.

Referring now to FIG. 5 of the drawing, it is to be noted that the spider plate 30 also carries a pivot pin 160 which has pivotally mounted thereto one end portion of an actuating cam lever or rocker arm 162 which forms another part of the linkage device with the opposite end portion of the rocker arm 162 overlying the pivoted end portion of the cam follower support lever 132 and adjustably engaging an intermediate portion 164 thereof by an adjusting screw 166, threadably carried by the rocker arm 162, and a lock nut 168 serves to maintain the desired adjustment of the screw 166 seated within a socket, defined by the intermediate portion 164 of the cam follower supporting lever 132. The socket may be provided with a bottom wall portion which is preferably hardened to resist rapid wear due to the engagement thereof by the screw 166.

A second or linkage actuated cam device for compensating for the wear of the clutch lining pieces 46 of the clutch band 42 and the expansion of the drum flange 18, as stated above, is provided which includes a second or arcuate cam surface 170 disposed on the rocker arm 162 and a second cam follower or roller 172 carried by the clutch band end shoe 73 which engages the arcuate cam surface 170. As illustrated in FIG. 5, it is to be noted that the second or arcuate cam surface 170 is struck about a radius R having a center which differs from the center of rotation which is common to the main power shaft 10, drum 12, outer 22 and inner 24 surfaces of the drum flange 18 and the plunger cam 76 and for the purpose of illustration, the arcuate cam surface 170 is exaggerated in FIG. 5 to better show the angularity and disposition thereof relative to the other elements of the invention illustrated therein. The cam follower or roller 172 is carried by a pin 174 journalled between a pair of rigid webs 176 and 178 supported by the end clutch shoe 73.

It is also to be noted that the bias 70 not only normally maintains the clutch band 42 out of engagement with the inner surface 24 of the drum flange 18 but also serves to normally maintain the rocker arm 162 in a desired relative position with the screw 166 seated within the socket against the hardened bottom wall thereof and the cam follower or roller 172 maintained in engagement with the cam surface 170.

A modification of the linkage actuated cam device is illustrated in FIGS. 6 and 7 of the drawing wherein it will be readily noted that a rocker arm 262 is recessed intermediate the end portions thereof in a location thereon where the second cam surface 170 of the modification of the invention, as illustrated in FIGS. 1–5, would normally be disposed and in the recess there is journalled a modification of the second cam follower or roller 272 by a shaft 274 which extends between webs 276 and 278 which are secured to the rocker arm 262 and the clutch band end shoe 73 has secured thereto by a suitable fastener, such as spot welds, an element provided with a modification of the second or arcuate cam surface 270 which is similar in configuration and which is struck about a center common to the center of the cam surface 170.

Operation

The clutch control or actuating mechanism of the invention operates to compensate for wear of the clutch lining pieces 46 of the clutch band 42 and to compensate for the expansion due to heat of the drum flange 18, and in FIG. 5 there is shown the mechanism in clutch disengaged position and it is to be noted that the forward edge 190 of the second cam surface 170 is disposed relatively further away from the inner surface 24 of the drum flange 18 than the rear edge 192.

Hence, the second cam surfaces 170 and 270, in effect, form relatively steep wedge-like elements which may be considered as being disposed between the inner surface 24 of the drum flange 18 and the rocker arms 162 or 262, respectively. When the rod 108 of the clutch actuating mechanism is actuated to move the plunger cam 76, the cam follower support lever 132 is urged, as viewed in FIG. 5, to the clutch engaged position as shown in FIG. 2, about the pivot pin 160 with the pivot rocker arms 162 and 262, of the respective modifications also being moved with the above mentioned wedge-like relationship being maintained by the second cam surfaces 170 or 270 and the inner surface 24 of the drum flange 18.

Bearing the above relative movement in mind, it will be appreciated that with wear on the clutch band lining pieces 46 or expansion of the drum flange 18 due to excessive heat, the live end 50 of the clutch band will tend to be excessively spaced from the drum 12 when the clutch assembly is disengaged and will be further separated from the dead end 48 thereof when the clutch assembly is engaged. However, the second or cam followers 172 or 272 will move along the second cam surfaces 170 or 270 which, due to the inclination and disposition thereof relative to the inner surface 24 of the drum flange 18, will automatically maintain the clutch band 42 positioned to compensate for the undesired excessive spacing and further separation. That is to say, the exact location at which the second cam followers 172 or 272 engage the respective second cam surfaces 170 or 270 will be dependent upon the internal diameter of the inner surface 24 of the drum flange 18 which in turn is a function of the drum flange temperature and the amount of wear on the clutch band lining pieces 46. The adjusting screw 166 is provided, of course, to position the lever 132 and the rocker arm 162 relative to each other and to aid in taking care of wear in the various elements of the devices, the clutch band and the inner surface 24 of the drum flange 18.

While the invention has been described, disclosed and illustrated in terms of certain embodiments or modifications which it has assumed in practice, the scope of the invention should not be deemed to be limited by the precise embodiments or modifications herein shown, illustrated, described and disclosed, and it is to be understood that other such embodiments or modifications are intended to be reserved, especially as they fall within the scope and breadth of the claims herein appended.

I claim as my invention:

1. In combination, an elongated power shaft supported for rotation about the longitudinal axis thereof, said shaft having a hollow end portion, a rotatable drum having a flange portion defining a generally axially extending circumferentially annular surface, a clutch assembly mounted on said shaft for rotation therewith, said clutch assembly comprising a clutch band for engaging the surface of said drum to enable the drum to rotate with said shaft, and clutch actuating mechanism for urging said clutch band into engagement with the surface of said drum, said clutch actuating mechanism comprising a moveably mounted plunger having a cam surface thereon extending into the hollow end portion of said shaft, a manually operable control rod for moving said plunger generally axially relative to said shaft, a first elongated lever having one end portion thereof pivotally mounted to said clutch assembly, a cam follower carried by the other end portion of said first lever in engagement with the cam surface on said plunger, a second elongated lever having one end portion thereof pivotally mounted to the clutch assembly, an adjustable connection between the other end portion of the second lever and an intermediate portion of the first lever, and a cam device interposed between the clutch band and an intermediate portion of said second lever, said cam device comprising an arcuate surface having a center which differs from the center of the axis of rotation of said shaft and a cam follower in engagement with said arcuate surface.

2. The structure as set forth in claim 1 wherein said arcuate surface of the cam device is disposed on the intermediate portion of the second lever and said cam follower of the cam device is carried by the clutch band.

3. The structure as set forth in claim 1 wherein said arcuate surface of the cam device is disposed on the clutch band and the cam follower of the cam device is carried by the intermediate portion of the second lever.

4. In combination with a rotatably mounted drum and a clutch assembly for engaging the drum,
  clutch actuating mechanism for urging said clutch assembly into engagement with said drum,
  said clutch actuating mechanism comprising
  a first cam device,
  a linkage device actuated by said first cam device,
  said linkage device comprising a first lever having one end portion thereof pivotally connected to the clutch assembly,
  a first cam follower carried by the other end portion of the first lever in engagement with said first cam device,
  a second lever having one end portion pivotally connected to the clutch assembly with the other end portion thereof engaging an intermediate portion of the first lever, and
  a second cam device actuated by the second lever of the linkage device,
  said second cam device comprising an arcuate surface having a center which differs from the center of the axis of rotation of the drum and a second cam follower disposed in engagement with the arcuate surface.

5. The structure as set forth in claim 4 together with an adjustable connection between the other end portion of said second lever and the intermediate portion of said first lever.

6. The structure as set forth in claim 5 wherein said adjustable connection comprises a socket having wall portions defining a recess on one of said levers and an outwardly projecting member adjustably mounted to the other lever extending into the recess of said socket.

7. The structure as set forth in claim 6 wherein at least one wall portion of said socket is hardened.

8. The structure as set forth in claim 4 together with a bias for maintaining said first cam follower in engagement with said first cam device, and a bias for maintaining said other end portion of the second lever in engagement with the intermediate portion of the first lever.

9. The structure as set forth in claim 4 wherein said arcuate surface of said second cam device is disposed on the intermediate portion of the second lever and said second cam follower is carried by a part of the clutch assembly.

10. The structure as set forth in claim 4 wherein said arcuate surface of said second cam device is disposed on a part of the clutch assembly, and said second cam follower is carried by the intermediate portion of said second lever.

11. Clutch actuating mechanism for urging a clutch assembly into engagement with a rotatable drum,
  said clutch actuating mechanism comprising
  first cam means,
  a linkage device actuated by said first cam means,
  said linkage device comprising a first lever having one end portion thereof pivotally connected to the clutch assembly,
  a cam follower carried by the other end portion of the first lever in engagement with said first cam means,
  a second lever having one end portion pivotally connected to the clutch assembly with the other end portion thereof engaging an intermediate portion of the first lever, and
  second cam means actuated by the second lever of the linkage device,
  said second cam means comprising an arcuate surface having a center which differs from the center of the axis of rotation of the drum and a cam follower disposed in engagement with the arcuate surface.

12. Mechanism for urging a part of a clutch assembly into engagement with a rotatable drum, said mechanism comprising a first cam surface, a first lever pivotally mounted on the clutch assembly, a first cam follower carried by said first lever in engagement with the first cam surface, a second lever pivotally mounted on the clutch assembly and adjustably connected to said first lever, an arcuate cam surface having a center which differs from the center of rotation of the drum, and a second cam follower in engagement with the arcuate cam surface, said arcuate cam surface and the second cam follower both being interposed between an intermediate portion of the second lever and the part of said clutch assembly.

13. In combination with a rotatable drum and a clutch assembly having a clutch band engageable with said drum, clutch actuating mechanism for urging the clutch band between drum engaging and drum disengaging positions, said clutch actuating mechanism comprising a cam device, a linkage device actuated by said cam device, and another cam device actuated by said linkage device, said another cam device comprising an arcuate cam surface having a center which differs from the center about which the drum rotates and a cam follower in engagement with the arcuate cam surface, said arcuate cam surface and the cam follower being interposed between an intermediate portion of the linkage device and the clutch band and effective on actuation of the first mentioned cam device, through the linkage device, to urge the clutch band to move between the said positions.

14. In combination with a rotatable drum having a flange portion defining a clutch engaging surface and a clutch assembly comprising a clutch band for engaging the surface of the drum, clutch actuating mechanism for urging the clutch band into engagement with the surface of the drum, said clutch actuating mechanism comprising a linkage device, first cam means for actuating said linkage device, and second cam means for urging the clutch band into engagement with the surface of the drum, said second cam means comprising an arcuate cam surface having a center which differs from the center about which the drum rotates and a cam follower disposed in engagement with the arcuate cam surface, said arcuate cam surface and cam follower each being disposed between an intermediate portion of the linkage device and the clutch band.

15. In combination, an elongate shaft supported for rotation about the longitudinal axis thereof, a drum having a flange portion defining a generally axially extending circumferentially annular surface, a clutch assembly mounted on said shaft for rotation therewith, said clutch assembly comprising a clutch band for engaging the surface of said drum to enable the drum to rotate with said shaft, and clutch actuating mechanism for urging said clutch band into engagement with the surface of said drum, said clutch actuating mechanism comprising a cam surface carried by said shaft, a first elongated lever having one end portion thereof pivotally mounted to said clutch assembly, a cam follower carried by the other end portion of said first lever in engagement with the cam surface, a second elongated lever having one end portion thereof pivotally mounted to the clutch assembly, a cam device interposed between the clutch band and an intermediate portion of said second lever, said cam device comprising an arcuate surface having a center which differs from the center of the axis of rotation of said shaft and a cam follower in engagement with said arcuate surface.

16. In combination, a rotatable drum having a flange portion defining a generally axially extending circumferentially annular surface, a clutch assembly mounted on a shaft for rotation therewith, said clutch assembly comprising a clutch band for engaging the surface of said drum to enable the drum to rotate with said shaft, and clutch actuating mechanism for urging said clutch band into engagement with the surface of said drum, said clutch actuating mechanism comprising a first elongated lever having one end portion thereof pivotally mounted to said clutch assembly, a cam follower carried by the other end portion of said first lever in engagement with a cam surface carried by said shaft, a second elongated lever having one end portion thereof pivotally mounted to the clutch assembly, a cam device interposed between the clutch band and an intermediate portion of said second lever, said cam device comprising an arcuate surface having a center which differs from the center of the axis of rotation of said drum and a cam follower in engagement with said arcuate surface.

References Cited by the Examiner

UNITED STATES PATENTS

| 150,433 | 5/74 | Sweet et al. | 192—78 |
| 1,673,509 | 6/28 | Heisler | 192—17 |
| 1,928,324 | 9/33 | Wittberger | 192—77 |
| 2,197,063 | 4/40 | Ashton | 192—93 XR |
| 2,277,659 | 3/42 | Bokich | 192—78 |
| 2,392,188 | 1/46 | Rauch | 192—77 |
| 2,904,147 | 9/59 | Alwood | 192—78 XR |

FOREIGN PATENTS

| 137,510 | 1/20 | Great Britain. |
| 348,095 | 1931 | Great Britain. |

DAVID J. WILLIAMOWSKY, *Primary Examiner.*

THOMAS J. HICKEY, *Examiner.*